United States Patent Office 2,890,408
Patented June 9, 1959

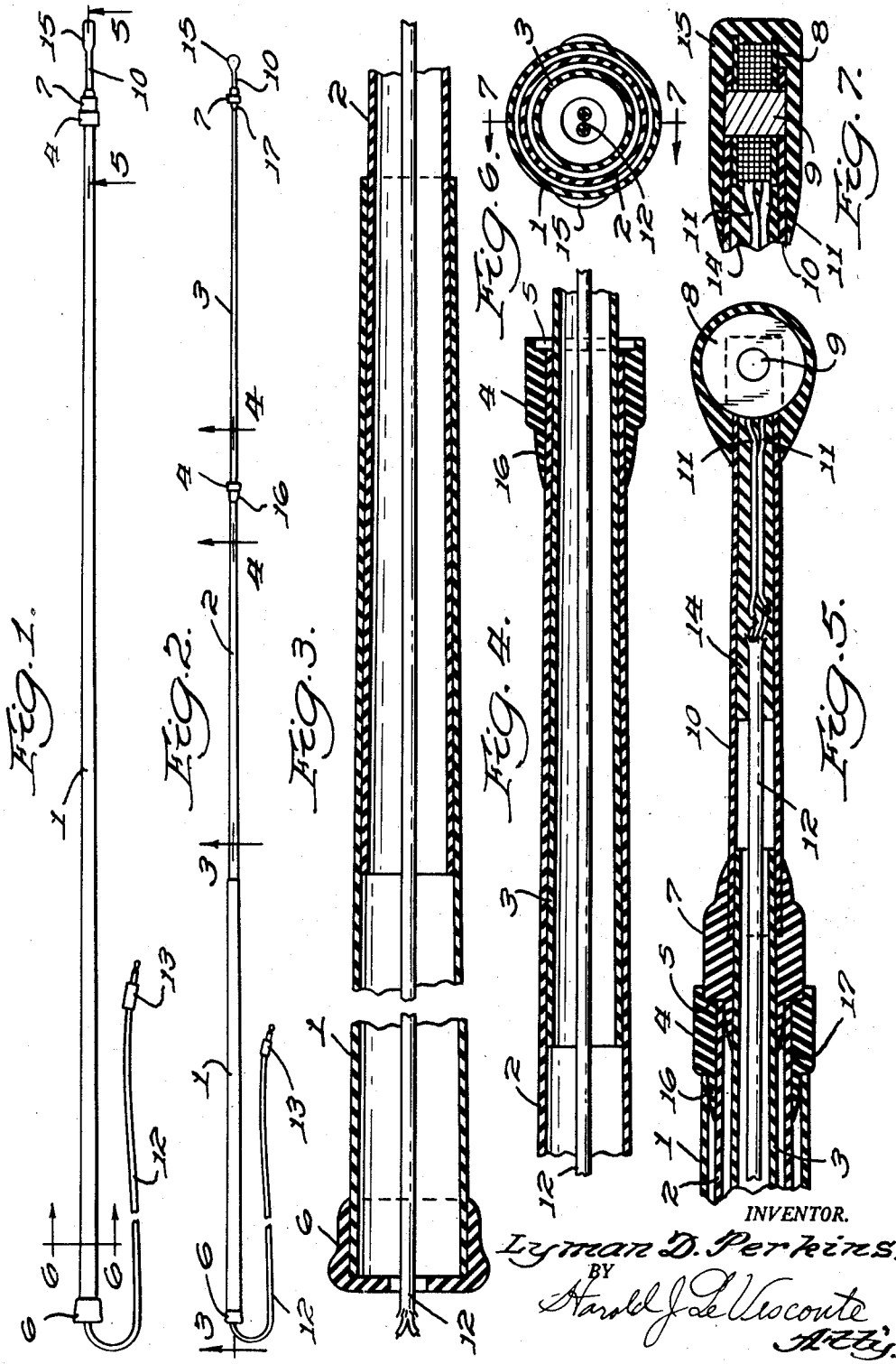

2,890,408

SUPPORT FOR LINE TROUBLE DETECTING MEANS

Lyman D. Perkins, Tarzana, Calif.

Application August 30, 1954, Serial No. 452,797

4 Claims. (Cl. 324—52)

This invention relates to flaw detection in electrical circuits and more particularly to a novel mounting means for a pickup coil adapted for use in detecting circuit breaks or shorts in relatively inaccessible places such as along a cable carrying communication circuit conductors which may be elevated in the air or which may be located underground and to which access may be had only through manholes. With respect to locating line troubles in overhead cables, it has been necessary as a general rule, to check the cable at each pole and after finding that the trouble lies between two adjacent poles to then locate the exact point at which the trouble is located. Similarly, in the case of underground wires, it has been necessary to descend into each manhole along the line and make the necessary tests to locate the point of trouble between adjacent manholes. The procedure in either case is to impose a current on the line in which the trouble occurs and is to be traced having a frequency in a range audible to the human ear and to place a pickup coil connected to an earphone with interposed amplifying means in close proximity to the cable at various ponits along its length starting at the point of imposition of the tracing current until a point occurs at which the tone of the imposed current is no longer audible, that point indicating the break or short in the line.

The present invention employs the same general procedure and has for its principal object the provision of a supporting means for a pickup coil comprising a series of coaxially arranged tubes which may be extended into self-interlocking position to form a support of sufficient length to enable the coil to be moved along the surface of an overhead cable from the ground or to be inserted into manholes and the like to check the exposed portions of underground cables without the necessity of descending into the manholes one by one for that purpose.

Another object of the invention is to provide an extendible pole-like support for a pickup coil which is constructed and arranged to form water tight joints between its various sections incident to being extended.

Still another object of the invention is to provide a supporting means for a pickup coil which is of light weight and which is formed completely of non-conductive material to protect the user in the event of contact with high voltage conductors.

With the foregoing objects in view, together with such additional objects and advantages as may subsequently appear, the invention resides in the parts, and in the construction, combination and arrangement of parts described, by way of example, in the following specification of one mode of execution of the invention; reference being had to the accompanying drawings which form a part of said specification and in which drawings:

Fig. 1 is a side elevation of a pickup coil and the novel supporting means therefor shown in collapsed condition, Fig. 2 is a side elevational view in reduced scale taken at right angles to Fig. 1 and showing the supporting means extended for use, Fig. 3 is an enlarged, fragmentary, sectional view taken on the line 3–3 of Fig. 2, Fig. 4 is an enlarged, fragmentary, sectional view taken on the line 4–4 of Fig. 2, Fig. 5 is an enlarged, fragmentary, sectional view taken on the line 5–5 of Fig. 1, Fig. 6 is an enlarged, transverse sectional view taken on the line 6–6 of Fig. 1, and Fig. 7 is a fragmentary sectional view of the pick-up coil end of the device taken on the plane defined by the line 7—7 of Fig. 6.

The illustrated embodiment of the invention comprises a pole formed from three telescopically disposed tapered tubes 1, 2 and 3 so chosen as to size that when extended, the larger end of the tube 2 will be frictionally engaged within the smaller end of the tube 1 (see Fig. 3) and the larger end of the tube 3 will be similarly engaged within the smaller end of the tube 2 (see Fig. 4). In the illustrated example, the entire extended pole has a length of approximately 24 feet, but it will be appreciated that the number of tube sections and their individual lengths may be varied to suit individual requirements. The tube sections in the illustrated form of the invention are formed from plastic impregnated glass cloth wound on mandrels of the desired sizes and taper, the plastic being afterwards cured by application of heat to unite the plies. This makes a very strong and light weight construction having high insulating qualities. The tubes are relatively thin walled and on being brought together in extending the pole they yield sufficiently to cause the surfaces thereof to form a self-sustaining, water tight joint (see Figs. 3 and 4) the latter being especially desirable when the use involves the projection of the coil into a water filled manhole or like location. The exterior of the smaller end of the tube section 2 is provided with a collar element 4 formed by winding a quantity of tape similar to the material forming the tube thereon after it is inserted in the tube 1; said collar having a concavity 5 in the outer end thereof. The exterior of the collar 4 serves to prevent the tube 2 from contacting the cap 6 at the large end of the tube 1 when the pole is collapsed and the concavity 5 serves similarly to engage a head collar 7 formed on the small end of the tube 3. The coil 8 is wound on a powdered iron core 9 and the ends of the core are mounted in the sides of a short tube 10 which is slotted at one end thereof to receive the coil as best shown in Fig. 7. The leads 11, 11 from the coil extend into the tube 10 for about half its length and are connected to the leads of the conductor cord 12 which extends therefrom through the cap 6 and terminates in a jack plug 13 which may be plugged into a means for rendering currents induced in said coil susceptible of sensory perception such as, for example, an amplifier means connected in turn to an ear phone; said amplifier being of such light weight and small size to permit its being carried by the user by attachment to the belt or the like. The coil leads and cord are connected before the coil is mounted in the slotted tube 10 and after the coil is thus mounted the tube 10 is filled with an insulating compound 14 poured therein and allowed to harden; the level of such compound being beyond the splice connecting to coil leads to the cord so that any pulling on the cord incident to use will not be communicated to the coil leads. The internal diameter of the tube 10 is such that it fits closely over the small end of the tube 3 and it is secured thereto both by cementing the contacting surfaces of the two tubes and by the winding of plastic impregnated glass cloth comprising the collar 7 as best shown in Fig. 5. After the coil is mounted in the end of the tube 10, the coil and the adjacent end of the tube are covered with a thick, rubber-like coating 15 to waterproof and protect the coil from physical damage as well as to provide a non-conductive outer surface for the device. Preferably, the inner ends of the head forming collars 4 and 7 are provided with extensions 16 and 17, respectively, which closely engage the inner surfaces of the tubes 1 and 2 when the pole structure is collapsed and thus keep the pole surfaces out of contact except at the larger ends thereof. If desired, this fit may be sufficiently tight to tend to hold the tubes against accidental displacement when the pole is collapsed.

The mode of operation of the device is believed to be obvious. On report of trouble in a line requiring tracing to find a break or the like, the tone producing frequency is imposed on the line and the user of the device follows the course of the line with the coil held close to the line in the case of overhead lines until a point is reached at which the tone is no longer heard, that point being the point at which the defect causing the trouble is located. In the case of underground circuits, the coil is placed in close proximity to the cable at each manhole or vault; it being necessary only to remove the cover, lower the coil on the extended pole to the conductor and listen for the imposed tone. When a point is reached at which the tone is no longer heard, it is known that the trouble is somewhere between the two manholes and other procedures can then be followed to locate the exact point of trouble. If is not necessary to descend into each manhole for the testing nor is it necessary to empty flooded manholes and vaults to enable the tests to be made. In both cases the point of trouble can be located with a great saving of time and expense as compared to methods currently in use.

Moreover, since the entire supporting apparatus is formed of non-conductnig materials, it may be used in safety in places in which by reason of storms, fires and the like, power lines and communication lines are intermingled and tangled and in which the communication lines may be shorted to a high voltage line.

It is appreciated that in the light of the foregoing disclosure, modifications and changes may suggest themselves to others skilled in the art to which the invention appertains. Therefore, the invention is not to be deemed to be limited to the exact form thereof above disclosed by way of example and it will be understood that the invention embraces all such changes and modifications in the parts, and in the construction combination and arrangement of parts as shall come within the purview of the appended claims.

I claim:

1. In a line trouble detecting means, a hollow, coil supporting rod structure comprising a plurality of telescopically nested, similarly tapered tubes formed of electrically non-conductive material; said tubes being arranged with their smaller ends adjacent each other when nested and the larger outer diameter of each of said tubes disposed within another of said tubes being greater than the inner diameter of the smaller end of said other tube with resultant creation, upon extension of said tubes, of a frictional self sustaining, waterproof joint between the interengaged ends thereof, the small end of the innermost of said tubes serving as a mounting means for a pickup coil supporting means and said tubes serving as a protective housing for a flexible conductor means extending therethrough from the coil to a point beyond the extended tubes and adapted for connection of said conductor means to devices operative to convert currents induced in said coil into signals susceptible of sensory perception; said tubes when extended and forming said water tight joints being effective to permit exploration of submerged or submarine lines by said pick up coil.

2. A detecting means as claimed in claim 1 in which each of said rods other than the outermost rod carries a collar at the smaller end thereof engageable with the smaller end of the tube within which it is disposed effective to prevent the withdrawal of one tube from the interior of another tube.

3. A detecting means as claimed in claim 2 in which each of said collars at the outer end thereof is provided with a concavity in which the collar of the tube therewithin is nested when said rod structure is collapsed.

4. A detecting means as claimed in claim 2 in which said smaller tubes adjacent to the collars carried thereby include enlarged portions closely fitting the inside diameter of the small end of the tube within which it is nested whereby when said tubes are nested, they contact each other at the ends thereof only.

References Cited in the file of this patent

UNITED STATES PATENTS

| | | |
|---|---|---|
| 269,439 | McEvoy | Dec. 19, 1882 |
| 2,103,179 | Rennau | Dec. 21, 1937 |
| 2,291,533 | Cummings | July 28, 1942 |
| 2,344,425 | Snyder | Mar. 14, 1944 |
| 2,376,659 | Chierix | May 22, 1945 |
| 2,675,256 | Cornell | Apr. 13, 1954 |
| 2,725,539 | Merrill et al. | Nov. 29, 1955 |
| 2,787,484 | Macy | Apr. 2, 1957 |